(12) United States Patent
Tong

(10) Patent No.: US 10,988,152 B2
(45) Date of Patent: Apr. 27, 2021

(54) COLLAPSIBLE CART

(71) Applicant: Pengfei Tong, City of Industry, CA (US)

(72) Inventor: Pengfei Tong, City of Industry, CA (US)

(*) Notice: Subject to any disclaimer, the term of this patent is extended or adjusted under 35 U.S.C. 154(b) by 0 days.

(21) Appl. No.: 16/533,567

(22) Filed: Aug. 6, 2019

(65) Prior Publication Data
US 2021/0039696 A1 Feb. 11, 2021

(51) Int. Cl.
*B62B 3/02* (2006.01)

(52) U.S. Cl.
CPC ............ *B62B 3/02* (2013.01); *B62B 2205/02* (2013.01); *B62B 2205/06* (2013.01)

(58) Field of Classification Search
CPC .... B62B 3/02; B62B 5/06; B62B 3/04; B62B 2202/404; B62B 3/022
See application file for complete search history.

(56) References Cited

U.S. PATENT DOCUMENTS

| | | | | |
|---|---|---|---|---|
| 1,919,103 A * | 7/1933 | Dolge | ...................... | B62B 3/02 280/640 |
| 1,998,269 A * | 4/1935 | Brown | ................... | A61G 21/00 27/27 |
| 2,016,232 A * | 10/1935 | Floyd | ....................... | B62B 3/02 280/640 |
| 2,020,766 A * | 11/1935 | Brown | ................... | B62B 3/106 280/639 |
| 6,354,619 B1 * | 3/2002 | Kim | ....................... | B62B 3/106 280/649 |
| 6,491,318 B1 * | 12/2002 | Galt | ......................... | B62B 3/02 280/42 |
| 10,272,937 B2 * | 4/2019 | Chen | ..................... | B62B 5/0003 |
| 10,399,586 B1 * | 9/2019 | Huang | ................... | B62B 3/003 |
| 2010/0090444 A1 * | 4/2010 | Chen | ....................... | B62B 3/007 280/651 |

* cited by examiner

*Primary Examiner* — John D Walters
*Assistant Examiner* — James J Triggs
(74) *Attorney, Agent, or Firm* — Che-Yang Chen; Law Office of Michael Chen

(57) ABSTRACT

A collapsible cart may include a handle, a first supporting frame, a second supporting frame, a pair of collapsible connecting members, each including a plurality of connecting units and connecting rods, and a pair of side connecting members, wherein the connecting units are linearly and pivotally connected to the first supporting frame and the second supporting frame, and the side connecting member is pivotally connected to the first and second supporting frames and the side connecting member, so when the movement of the side connecting member toward the center of the collapsible art triggers the collapse of the connecting member to minimize the size of the cart.

3 Claims, 5 Drawing Sheets

COLLAPSIBLE CART

FIELD OF THE INVENTION

The present invention is directed to a collapsible and portable cart, and in particular to a collapsible cart that can be used to store and transported various items, and the size of the cart can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, carts are primarily used for storing and transporting food, groceries and Bar-B-Q items, and even little child can be put therein.

Throughout the time, portable carts have been developed so the carts can be transported in a confined space (such as vehicle trunk), and quickly converted into a three-dimensional space supported by wheels to store and transport a plurality of items when arriving the outdoor destination such as parks, camping site, beaches, etc. U.S. Pat. No. 5,738,365 to McCarthy discloses a collapsible cart including a base member, first and second double L-shaped brackets, a pair of locking pins, and two locking bar members. The locking bar members and locking pins are utilized to lock the double L-shaped brackets into place when the cart is in the un-collapsed configuration.

U.S. Pat. No. 6,685,199 to Stravitz et al. discloses a collapsible frame which is readily folded up into a closed position having a narrow lateral profile and folded open back into the fully open position when needed. In the fully open position the cart will structurally support a storage container full of files or other items. No tools or other means are needed to fold up the cart into the folded position or to unfold the cart back into the fully open position.

However, the collapsible carts disclosed above may have too many conjugating points that would weaken the structure of the collapsible carts. It is also inconvenient for the user to engage/disengage every conjugating points when the user wants to use or store them. Therefore, there remains a need for a new and improved collapsible cart that is more convenient and efficient for the user to open up or store without putting any additional or unnecessary burden on the users.

SUMMARY OF THE INVENTION

It is an object of the present invention to provide a collapsible cart that can be stored and moved more conveniently and efficiently without putting any additional or unnecessary burden on the users.

It is another object of the present invention to provide a collapsible cart, the size of which can be easily minimized so the user can easily transport the cart to any destination the user wants to go, and uses the cart in the destination, such as a camping spot, park, etc.

In one aspect, a collapsible cart may include a handle, a first supporting frame, and a second supporting frame. In one embodiment, the handle is movably secured at the first supporting frame, and the first supporting frame and the second supporting frame are connected with a connecting member. The connecting member may include a plurality of connecting units that are linearly and pivotally connected with each other. More specifically, a first end of the first connecting unit is pivotally connected to a first lower corner end of the first supporting frame and a second end thereof is pivotally connected to a first end of the second connecting unit. The second end of the second connecting unit is pivotally connected to a first end of the third connecting unit, and so on, and a second end of the fourth connecting unit is pivotally connected to a first lower corner end of the second supporting frame corresponding to the lower corner of the first supporting frame.

Similarly, the connecting member may further include a plurality of connecting units that are linearly and pivotally connected with each other on the other side of the collapsible cart. More specifically, a first end of the first connecting unit is pivotally connected to a second lower corner end of the first supporting frame and a second end thereof is pivotally connected to a first end of the second connecting unit. The second end of the second connecting unit is pivotally connected to a first end of the third connecting unit, and so on, and a second end of the fourth connecting unit is pivotally connected to a second lower corner end of the second supporting frame corresponding to the lower corner of the first supporting frame.

The connecting member may further include a plurality of connecting rods interconnecting the connecting units on both sides of the connecting member and provide support for the cart. The connecting member is used not only to connect the first and second supporting frames, but also collapse the cart to a compact size, so it is convenient for the user to carry it out and store it in the garage or trunk.

The collapsible cart may further include a side connecting member that has a plurality of side supporting units that are pivotally connected with each other. More specifically, one end of the first side supporting unit is pivotally connected to one end of the second connecting unit and the center portion of the first side supporting unit is pivotally connected with the center portion of the second side supporting unit. One end of the second side supporting unit is pivotally connected to the first corner end of the first supporting frame, and the other end thereof is pivotally connected to one end of the third side supporting unit near the center of the collapsible cart, while the other end of the third side supporting unit is pivotally connected to the first corner end of the second supporting frame. Furthermore, one end of the fourth side supporting unit is pivotally connected with the first side supporting unit and second connecting unit.

Similarly, the side connecting member may have a plurality of side supporting units that are pivotally connected with each other on the other side of the collapsible cart. More specifically, one end of the first side supporting unit is pivotally connected to one end of the second connecting unit and the center portion of the first side supporting unit is pivotally connected with the center portion of the second side supporting unit. One end of the second side supporting unit is pivotally connected to the first corner end of the first supporting frame, and the other end thereof is pivotally connected to one end of the third side supporting unit near the center of the collapsible cart, while the other end of the third side supporting unit is pivotally connected to the first corner end of the second supporting frame. Furthermore, one end of the fourth side supporting unit is pivotally connected with the first side supporting unit and second connecting unit.

It is noted that the top ends of the first side supporting units on both sides of the cart are connected with a first horizontal bar, while the top ends of the fourth side supporting units are connected with a second horizontal bar.

When the collapsible cart is fully extended, a fabric can be disposed in a receiving space created between the first supporting frame and the second supporting frame, and if the user wishes to go picnic, he/she can put food, water, fruit, utensils, etc. in the receiving space. The collapsible cart further includes four wheels disposed at the bottom of the first supporting frame and the second supporting frame. With the wheels, the cart can be easily operated and moved from one place to another. It is noted that the side connecting member is pivotally connected to the first supporting frame through first connecting bars, and pivotally connected to the second supporting frame through second connecting bars.

It is noted that the connecting member forms a substantially flat surface at the bottom of the receiving space, and when the collapsible cart is fully extended, each side of the cart seems to have two X-shaped structure pivotally connected with each other on both sides thereof.

When the user finishes using the cart, the size of the cart can be significantly reduced to just occupy a minimum space. More particularly, the structure of the cart starts to collapse when the user holds the first horizontal bar and the second horizontal bar, and squeeze them toward the center portion of the cart. As discussed above, the first and second supporting framers; the connecting member and the side connecting members are pivotally connected together to a certain extent, so when the first horizontal bar and the second horizontal bar are being moved toward each other, the movement of side connecting members triggers the collapse of the connecting member to minimize the size of the cart. The cart can be eventually minimized.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
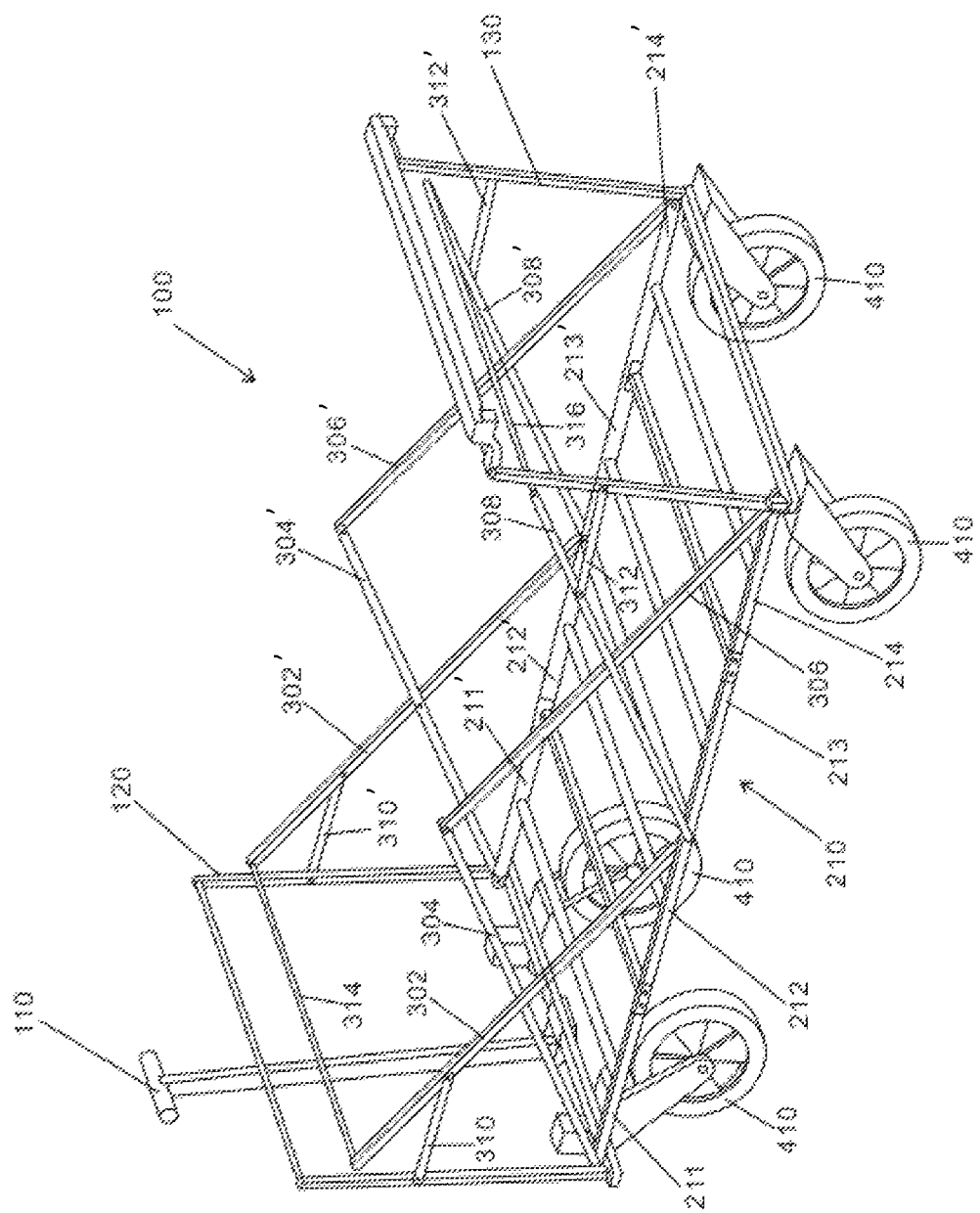
FIG. 1 illustrates a schematic perspective view of the collapsible cart in a fully open status in the present invention.
Figure 2:
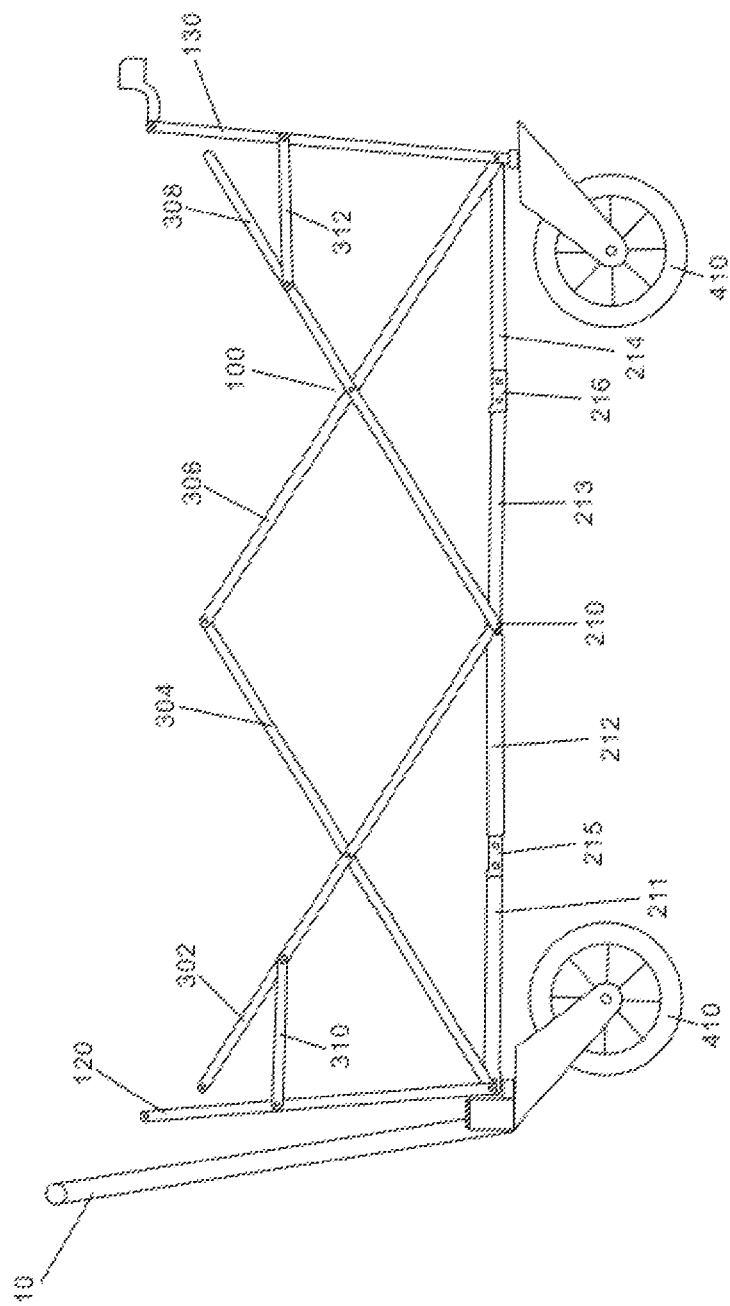
FIG. 2 illustrates a schematic latteral view of the collapsible cart in a fully open status in the present invention.

In order to further understand the goal, characteristics and effect of the present invention, a number of embodiments along with the drawings are illustrated as following:

In one aspect, as shown in FIGS. 1 to 5, a collapsible cart 100 may include a handle 110, a first supporting frame 120, and a second supporting frame 130. In one embodiment, the handle is movably secured at the first supporting frame 120, and the first supporting frame 120 and the second supporting frame 130 are connected with a pair of collapsible connecting members 210, as shown in FIGS. 1 and 2. Each connecting member 210 may include a plurality of connecting units (211, 212, 213, 214) that are linearly and pivotally connected with each other. More specifically, a first end of a first connecting unit 211 is pivotally connected to a first lower corner of the first supporting frame 120 and a second end thereof is pivotally connected to a first end of a second connecting unit 212. It is noted that the second end of the first connecting unit 211 is pivotally connected to one end a first hinge 215 and the first end of the second connecting unit 212 is pivotally connected to the other end of the first hinge 215. And a second end of the second connecting unit 212 is pivotally connected to a first end of a third connecting unit 213.

It is noted that a second end of the third connecting unit 213 is pivotally connected to one end of a second hinge 216 and a first end of the fourth connecting unit 214 is pivotally connected to the second hinge 216. And a second end of the fourth connecting unit 214 is pivotally connected to a first lower corner of the second supporting frame 130 corresponding to the first lower corner of the first supporting frame 120.

Similarly, the connecting member 210 may further include a plurality of connecting units (211', 212', 213', 214') that are linearly and pivotally connected with each other on the other side of the collapsible cart. More specifically, a first end of a first connecting unit 211' is pivotally connected to a second lower corner end of the first supporting frame 120 and a second end thereof is pivotally connected to a first end of the connecting unit 212'. It is noted that the second end of the first connecting unit 211' is pivotally connected to one end a third hinge 215' and the first end of the second connecting unit 212' is pivotally connected to the other end of the third hinge 215'. And a second end of the second connecting unit 212' is pivotally connected to a first end of a third connecting unit 213'.

It is noted that a second end of the third connecting unit 213' is pivotally connected to one end of a fourth hinge 216' and a first end of the fourth connecting unit 214' is pivotally connected to the other end of the fourth hinge 216'. And a second end of the fourth connecting unit 214' is pivotally connected to a first lower corner of the second supporting frame 130 corresponding to the first lower corner of the first supporting frame 120.

The connecting member 210 may further include a plurality of connecting rods interconnecting the connecting units on both sides of the connecting member 210 and provide support for the cart 100. The connecting member 210 is used not only to connect the first and second supporting frames 120 and 130, but also collapse the cart to a compact size, so it is convenient for the user to carry it out and store it in the garage or trunk.

The collapsible cart 100 may further include a side connecting member 300 that has a plurality of side supporting units (302, 304, 306, 308) that are pivotally connected with each other. More specifically, one end of the side supporting unit 302 is pivotally connected to one end of the connecting unit 212 and the center portion of the side supporting unit 302 is pivotally connected with the center portion of the side supporting unit 304. One end of the side supporting unit 304 is pivotally connected to the first corner end of the first supporting frame 120, and the other end thereof is pivotally connected to one end of the side supporting unit 306 near the center of the collapsible cart 100, while the other end of the side supporting unit 306 is pivotally connected to the first corner end of the second supporting frame 130. Furthermore, one end of the side supporting unit 308 is pivotally connected with side supporting unit 302 and connecting unit 212.

Similarly, the side connecting member 300 may have a plurality of side supporting units (302', 304', 306', 308') that are pivotally connected with each other on the other side of the collapsible cart 100. More specifically, one end of the side supporting unit 302' is pivotally connected to one end of the connecting unit 212' and the center portion of the side supporting unit 302' is pivotally connected with the center portion of the side supporting unit 304'. One end of the side supporting unit 304' is pivotally connected to the second corner end of the first supporting frame 120, and the other end thereof is pivotally connected to one end of the side supporting unit 306' near the center of the collapsible cart 100, while the other end of the side supporting unit 306' is pivotally connected to the second corner end of the second supporting frame 130. Furthermore, one end of the side supporting unit 308' is pivotally connected with side supporting unit 302' and connecting unit 212'. It is noted that the top ends of the side supporting unit 302 and 302' are connected with a first horizontal bar 314, while the top ends of the side supporting units 308 and 308' are connected with a second horizontal bar 316.

As shown in FIGS. 1 and 2, the collapsible cart is fully extended and a fabric (not shown) can be disposed in a receiving space created between the first supporting frame 120 and the second supporting frame 130, and if the user wishes to go picnic, he/she can put food, water, fruit, utensils, etc. in the receiving space. The collapsible cart further includes four wheels 410 disposed at the bottom of the first supporting frame 120 and the second supporting frame 130. With the wheels 410, the cart can be easily operated and moved from one place to another. It is noted that the side connecting member 300 is pivotally connected to the first supporting frame 120 through connecting bars 310 and 310', and pivotally connected to the second supporting frame 120 through connecting bars 312 and 312'.

It is noted that the connecting member 210 forms a substantially flat surface at the bottom of the receiving space, and when the collapsible cart is fully extended, each side of the cart 100 seems to have two X-shaped structure pivotally connected with each other on both sides thereof as shown in FIGS. 1 and 2.

Figure 3:
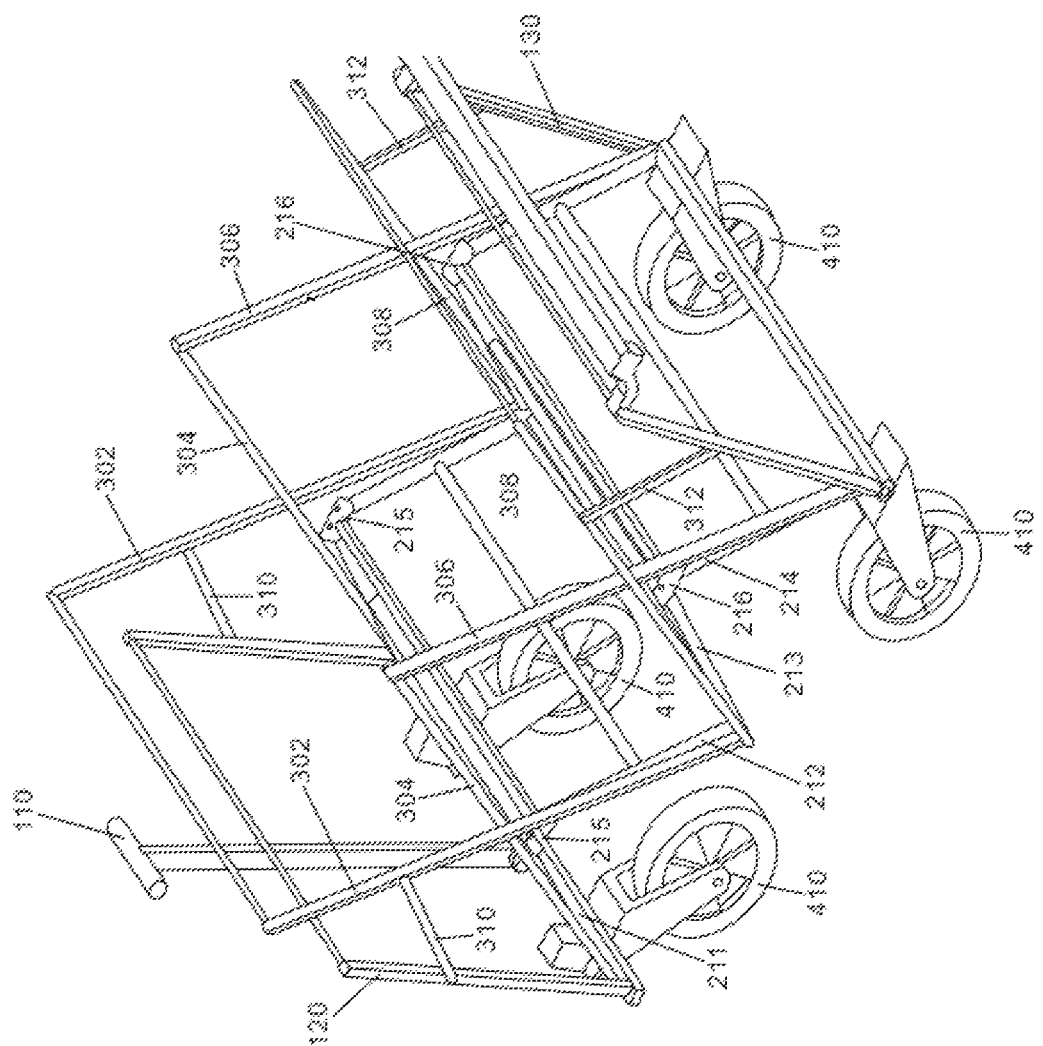
FIG. 3 illustrates the collapsible cart in the present invention that is being minimized.
Figure 4:
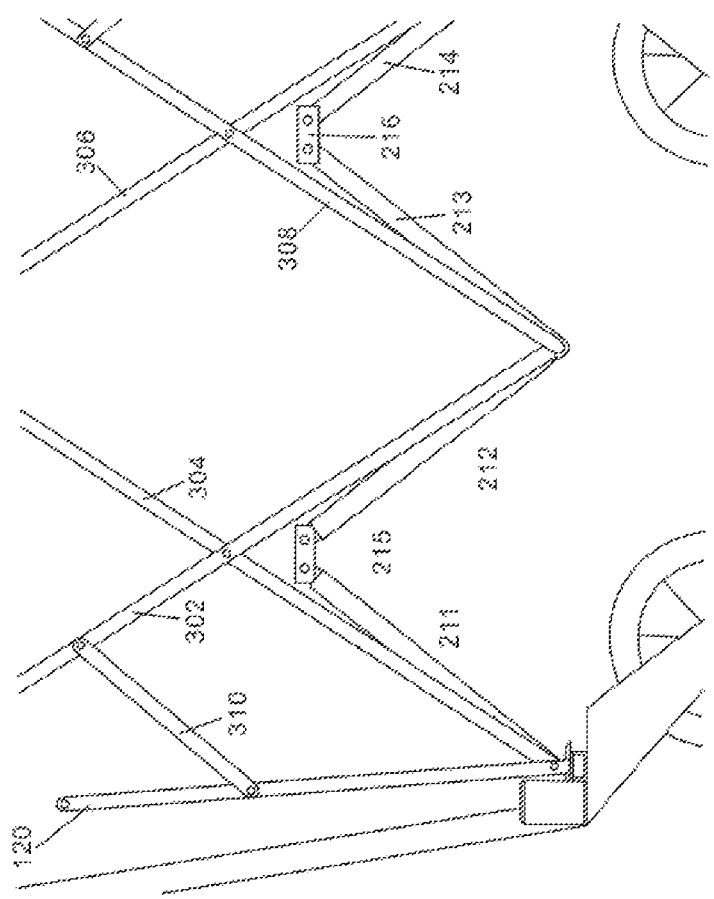
FIG. 4 illustrates the collapsible cart in the present invention that is being minimized focusing on the connecting member and the side connecting member.
Figure 5:
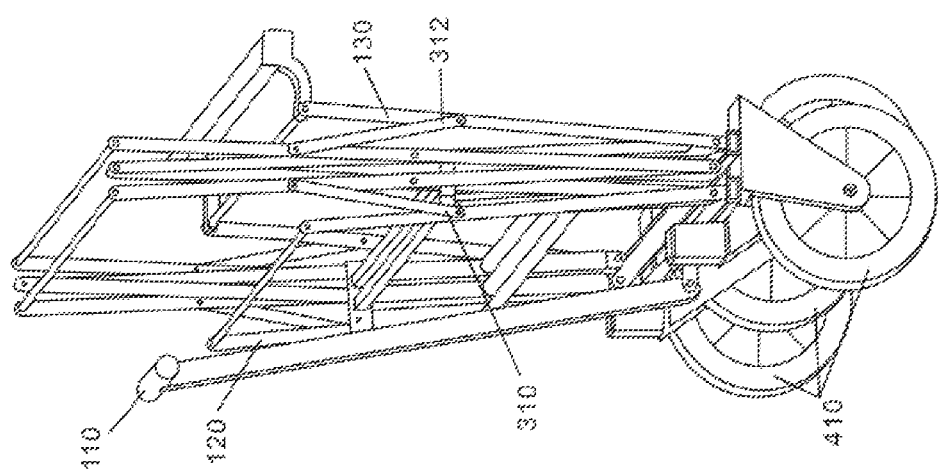
FIG. 5 illustrates the collapsible cart in the present invention with its most minimized size.

When the user finishes using the cart, the size of the cart can be significantly reduced to just occupy a minimum space. More particularly, the structure of the cart starts to collapse when the user holds the first horizontal bar 314 and the second horizontal bar 316, and squeeze them toward the center portion of the cart, as shown in FIGS. 3 to 5. As discussed above, the first and second supporting framers (120, 130); the connecting member 210 and the side connecting members 300 are pivotally connected together to a certain extent, so when the first horizontal bar 314 and the second horizontal bar 316 are being moved toward each other, the movement of side connecting members 300 triggers the collapse of the connecting member 210 to minimize the size of the cart 100. The cart can be eventually minimized as shown in FIG. 5.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A collapsible cart, comprising:
   a first supporting frame;
   a second supporting frame;
   a pair of collapsible connecting members pivotally connected to a lower portion of the respective first and second supporting frames, and
   a pair of side connecting members pivotally connected to an upper portion and a lower portion of the respective first and second supporting frames,
   wherein the pair of connecting members can be configured between an extended configuration in which the first and second supporting frames are spaced apart and a receiving space is defined between the first and second supporting frames and the pair of connecting members, and a collapsed configuration in which the first supporting frame is brought close to the second supporting frame to collapse the receiving space, and
   wherein each side connecting member includes a double scissor hinge structure pivotally interconnecting between the first and second supporting frames,
   wherein each connecting member includes a plurality of connecting units that are linearly and pivotally connected with each other at the lower portion of the respective first and second supporting frames,
   wherein a first end of a first connecting unit is pivotally connected to a first lower corner of the first supporting frame and a second end thereof is pivotally connected to a first end of a second connecting unit, and wherein a second end of the second connecting unit is pivotally connected to a first end of a third connecting unit.

2. The collapsible cart of claim 1, wherein the second end of the first connecting unit is pivotally connected to one end a first hinge and the first end of the second connecting unit is pivotally connected to the other end of the first hinge.

3. The collapsible cart of claim 1, wherein a second end of the third connecting unit is pivotally connected to one end of a second hinge and a first end of the fourth connecting unit is pivotally connected to the other end of the second hinge.

* * * * *